US012700352B2

(12) United States Patent
Lee et al.

(10) Patent No.: US 12,700,352 B2
(45) Date of Patent: Aug. 4, 2026

(54) DISPLAY PANEL AND DISPLAY DEVICE INCLUDING THE SAME

(71) Applicant: LG Display Co., Ltd., Seoul (KR)

(72) Inventors: Guen Sik Lee, Paju-si (KR); Tae Hun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/085,563

(22) Filed: Mar. 20, 2025

(65) Prior Publication Data

US 2026/0094557 A1 Apr. 2, 2026

(30) Foreign Application Priority Data

Sep. 30, 2024 (KR) ........................ 10-2024-0132652

(51) Int. Cl.
*G09G 3/32* (2016.01)

(52) U.S. Cl.
CPC ....... *G09G 3/32* (2013.01); *G09G 2300/0465* (2013.01); *G09G 2300/0819* (2013.01); *G09G 2330/021* (2013.01); *G09G 2360/14* (2013.01)

(58) Field of Classification Search
CPC ............. G09G 3/32; G09G 2300/0465; G09G 2300/0819; G09G 2330/021; G09G 2360/14; G09G 2360/142
See application file for complete search history.

(56) References Cited

U.S. PATENT DOCUMENTS

| | | | | |
|---|---|---|---|---|
| 2018/0261655 | A1 | 9/2018 | Lee et al. | |
| 2019/0341434 | A1 | 11/2019 | Lee et al. | |
| 2022/0075979 | A1* | 3/2022 | Han | G09G 3/3275 |
| 2023/0180570 | A1 | 6/2023 | Lee et al. | |

FOREIGN PATENT DOCUMENTS

| | | | |
|---|---|---|---|
| KR | 10-2463734 | B1 | 11/2022 |
| KR | 10-2023-0085421 | A | 6/2023 |

* cited by examiner

*Primary Examiner* — Michael Pervan
(74) *Attorney, Agent, or Firm* — Fenwick & West LLP

(57) ABSTRACT

The present disclosure provides a display panel including a display area including a first pixel area and a second pixel area in which a plurality of pixels are disposed, an optical sensor disposed to overlap the second pixel area, a plurality of infrared (IR) light sources disposed in the display area, and a driving circuit configured to drive the pixels and the IR light sources, wherein the pixels and the IR light sources alternately emit light to improve the amount of light received from the optical sensor.

20 Claims, 14 Drawing Sheets

DISPLAY PANEL AND DISPLAY DEVICE INCLUDING THE SAME

CROSS-REFERENCE TO RELATED APPLICATION

This application claims priority to and the benefit of Republic of Korea Patent Application No. 10-2024-0132652, filed on Sep. 30, 2024, which is hereby incorporated by reference in its entirety.

BACKGROUND

Field of Technology

The present disclosure relates to a display panel and a display device including the same.

Discussion of Related Art

Display devices are applied to various electronic devices such as televisions (TVs), portable phones, notebooks, tablets, etc.

Display devices include organic light emitting diode (OLED) display devices which emit light by themselves and liquid crystal display (LCD) devices which require a separate light source.

Particularly, in the case of portable phone displays, efforts have been made to increase the screen of the display as large as possible even on smartphones of the same size as the technology has developed, and as a result, the bezel size of the smartphone has been developed to be as small as possible as the screen size of the display increases.

With the development of such display devices, under display cameras (UDCs), under panel sensors (UPSs), and under display infrared radiation (UDIR) are receiving high attention.

In UDIR structures, since the infrared (IR) light source is inside the display panel, there is a reliability issue due to the lower transmittance in the UDIR application structure when compared to the general IR sensor.

In addition, when the intensity of the light source is increased due to the low transmittance, technical problems such as a decrease in the reliability of the IR light source may occur, and a method to solve these problems are required.

SUMMARY

As described above, in a display device including under display camera (UDC) and under panel sensor (UDIR) areas, the luminance of a sensor needs to be increased in order to increase the transmittance of the sensor disposed inside a display area, thereby degrading the device's reliability due to reduced element lifetime.

The present disclosure is directed to providing a display panel with improved operation reliability and a display device including the same.

The objects according to embodiments of the present disclosure are not limited to the above-described objects, and other objects that are not mentioned will be clearly understood by those skilled in the art from the following description.

According to an embodiment of the present disclosure, there is provided a display panel including a display area including a first pixel area and a second pixel area in which a plurality of pixels are disposed, an optical sensor disposed to overlap the second pixel area, a plurality of infrared (IR) light sources disposed in the display area, and a driving circuit configured to drive the pixels and the IR light sources, wherein the pixels and the IR light sources alternately emit light to improve the amount of light received from the optical sensor.

Specific details according to various examples of the present disclosure other than the methods for solving the above-mentioned problems are included in the following description and drawings.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
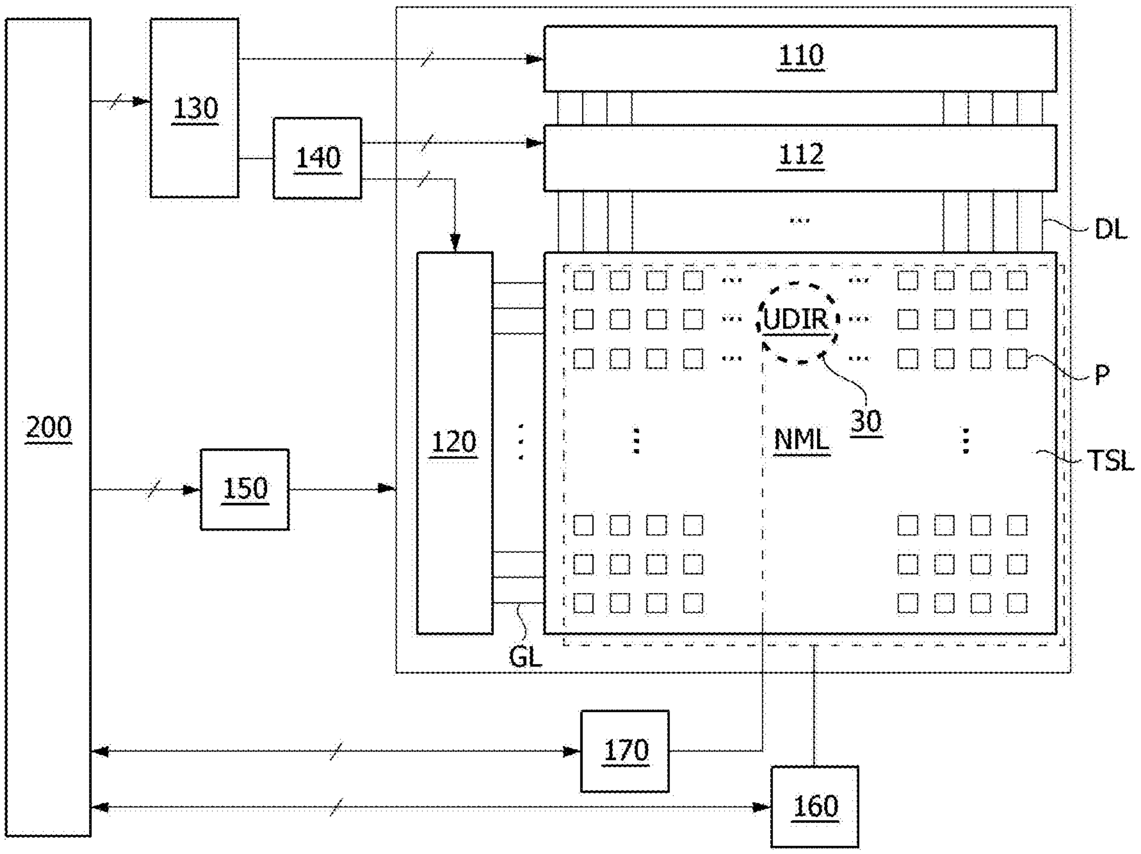
FIG. 1 is a block diagram illustrating a display device according to one embodiment of the present disclosure.

Advantages and features of the present disclosure, and methods of achieving them will become apparent with reference to the following embodiments, which are described in detail, in conjunction with the accompanying drawings. The present disclosure is not limited to embodiments to be described below and may be implemented in different forms, the embodiments are only provided to completely disclose the present disclosure and completely convey the scope of the present disclosure to those skilled in the art, and the present disclosure is defined by the disclosed claims.

Since the shapes, sizes, proportions, angles, numbers, and the like disclosed in the drawings for describing the embodiments of the present disclosure are only exemplary, the present disclosure is not limited to the items shown in the drawings. Throughout the specification, the same reference numerals refer to substantially the same components. Further, in describing the present disclosure, when it is determined that a detailed description of related known technology may unnecessarily obscure the gist of the present disclosure, the detailed description thereof will be omitted.

When "providing," "including," "having," "comprising," and the like described in the present disclosure are used, other parts may be added unless 'only' is used. A case in which a component is expressed in a singular form may also be interpreted as a plural form unless explicitly stated otherwise.

In interpreting a component, the component is interpreted as including the margin of error even when there is no separate explicit description.

When positional relationships and interconnection relationships between two components such as 'on,' 'above,' 'below,' 'next to,' 'connect or couple,' 'crossing or intersecting,' and the like are described, one or more other components may be interposed between the two components unless 'immediately' or 'directly' is mentioned.

When a temporal relationship is described as 'after,' 'following' 'then,' 'before,' or the like, the temporal relationship may not be continuous on a time axis unless 'immediately' or 'directly' is used.

First, second, and the like may be used to distinguish components, but the functions or structures of these components are not limited by the ordinal numbers in front of the components or component names.

The following embodiments may be partially or fully combined with each other, and technically, various types of interconnection and driving are possible. The embodiments may be implemented independently of each other or may be implemented together in an associated relationship.

In a display device according to the present disclosure, a pixel circuit and a gate driving circuit may include a plurality of transistors. The transistor may be an oxide thin film transistor (TFT) including an oxide semiconductor or a low temperature poly silicon (LTPS) TFT including LTPS.

A transistor is a three-electrode element including a gate, a source, and a drain. The source is an electrode through which carriers are supplied to the transistor. In the transistor, the carriers start to move from the source. The drain is an electrode through which the carriers exit the transistor. In the transistor, the carriers move from the source to the drain. In the case of an n-channel transistor, since the carriers are electrons, a source voltage is lower than a drain voltage to move electrons from the source to the drain. In the n-channel transistor, a current flows in a direction from the drain to the source. In the case of a p-channel transistor, since the carriers are holes, the source voltage is higher than the drain voltage to move holes from the source to the drain. In the p-channel transistor, since holes move from the source to the drain, a current flows from the source to the drain. It should be noted that the source and drain of the transistor are not fixed. For example, the source and drain may be switched depending on the applied voltage. Accordingly, the present disclosure is not limited by the source and drain of the transistor. In the following description, the source and drain of the transistor will be referred to as first and second electrodes.

A gate signal may swing between a gate-on voltage and a gate-off voltage. The transistor is turned on in response to the gate-on voltage and turned off in response to the gate-off voltage. In the case of an n-channel transistor, the gate-on voltage may be a gate high voltage VGH, and the gate-off voltage may be a gate low voltage VGL. In the case of the p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Figure 2:
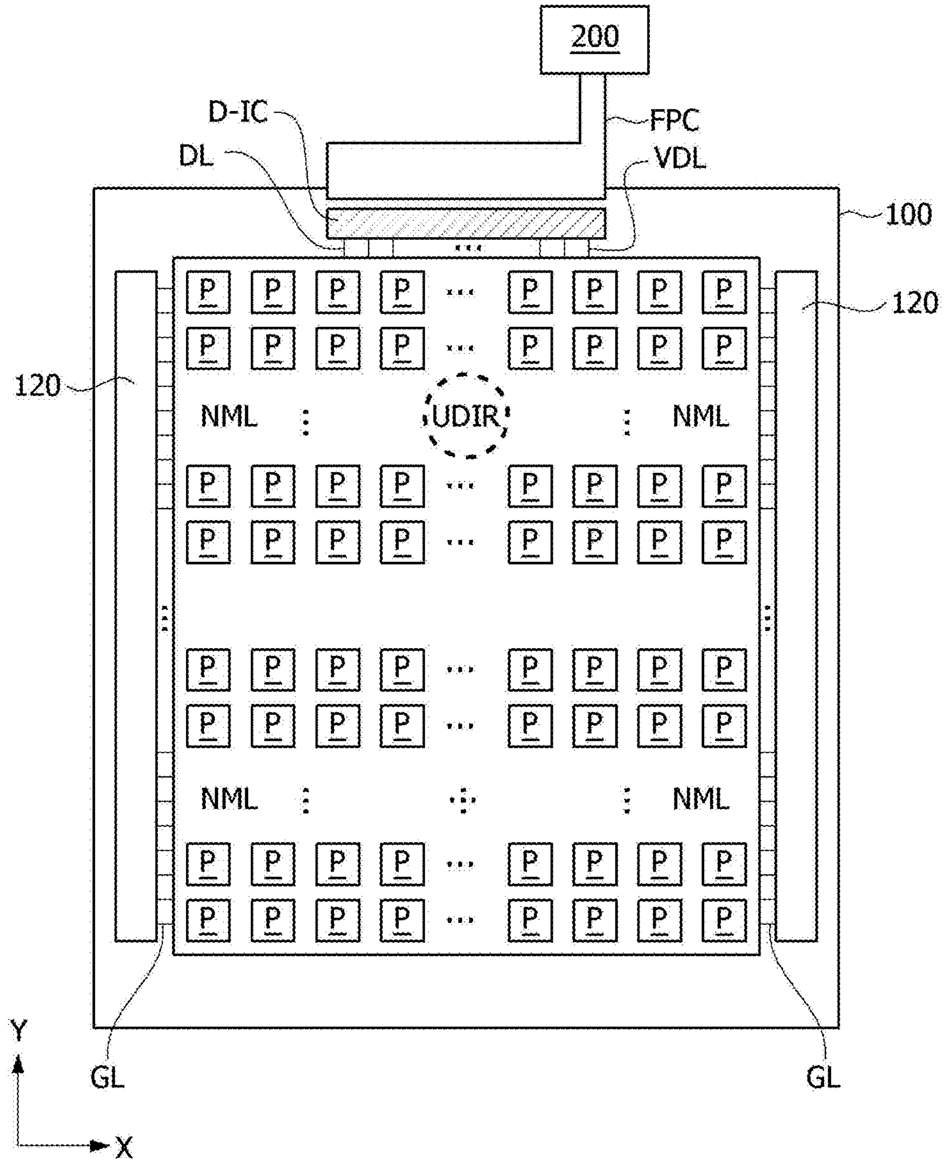
FIG. 2 is a schematic diagram illustrating a mobile terminal according to one embodiment of the present disclosure.
Figure 3A:
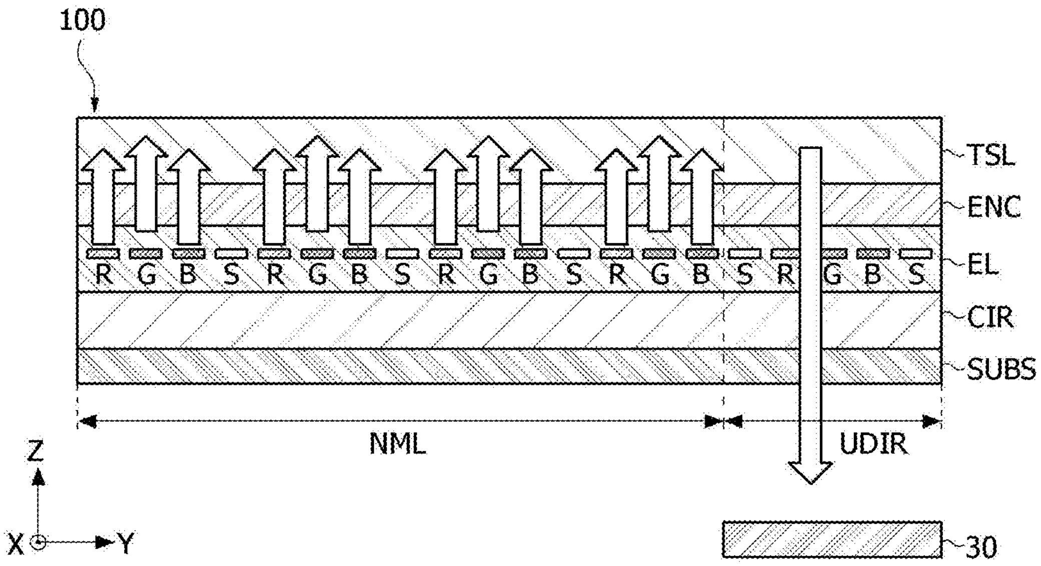
FIG. 3A is a cross-sectional view illustrating a cross-sectional structure of a display panel according to one embodiment of the present disclosure.
Figure 3B:
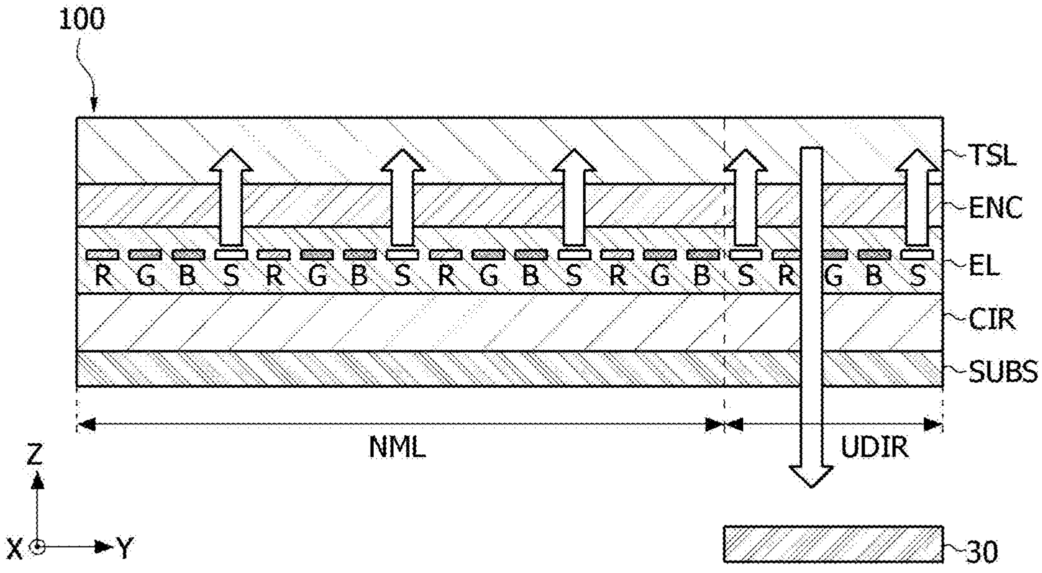
FIG. 3B is a cross-sectional view illustrating a cross-sectional structure of the display panel according to another embodiment of the present disclosure.

FIG. 1 is a block diagram illustrating a display device according to one embodiment of the present disclosure. FIG. 2 is a schematic diagram illustrating a mobile terminal according to one embodiment of the present disclosure. FIG. 3A is a cross-sectional view illustrating a cross-sectional structure of a display panel according to one embodiment of the present disclosure. FIG. 3B is a cross-sectional view illustrating a cross-sectional structure of the display panel according to another embodiment of the present disclosure.

Referring to FIGS. 1 to 3B, the display device according to the embodiment of the present disclosure includes a display panel 100, a display panel driving circuit for writing pixel data on display pixels of the display panel 100, and a power supply unit 150 (e.g., a circuit) for generating power required to drive the display pixels and the display panel driving circuit.

The display panel 100 may be a panel with a rectangular structure having a length in an X-axis direction, a width in a Y-axis direction, and a thickness in a Z-axis direction. The display panel 100 may be implemented as a non-transmissive display panel or a transmissive display panel. A transmissive display panel may be applied to a transparent display device of which a screen displays an image and through which a real background is visible. The display panel 100 may be manufactured as a flexible display panel.

The display area of the display panel 100 includes a pixel array that displays an input image. The pixel array includes a plurality of data lines DL, a plurality of gate lines GL intersecting the data lines DL, and display pixels disposed in the form of a matrix. The display panel 100 may further include power lines connected to the display pixels in common. The data lines DL may be formed long in the first direction, for example, the X-axis direction. The gate lines GL may be formed long in the second direction, for example, the Y-axis direction, and may intersect the data lines GL. The power lines are connected to constant voltage nodes of pixel circuits to supply a constant voltage required for driving display pixels P to the display pixels P.

Each of the pixels P may be divided into a red subpixel, a green subpixel, and a blue subpixel for color implementation. Each of the display pixels may further include aa white subpixel. Each of the subpixels includes a pixel circuit for driving the light emitting element. Each pixel circuit is connected to the data lines, the gate lines, and the power lines.

The light emitting element may be implemented as an organic light emitting diode (OLED). The light emitting element includes an anode electrode, a cathode electrode, and an organic compound layer formed between these electrodes. The organic compound layer may include, but is not limited to, a hole injection layer (HIL), a hole transport layer (HTL), an emissive layer (EML), an electron transport layer (ETL), and an electron injection layer (EIL). When a voltage is applied to the anode electrode and the cathode electrode of the light emitting element, holes passing through the HTL and electrons passing through the ETL move to the EML to form excitons. In this case, visible light is emitted by the EML. The light emitting element may be implemented in a tandem structure in which a plurality of EMLs are stacked. The light emitting element having a tandem structure may improve the luminance and lifetime of display pixels.

The display area of the display panel 100 includes a first pixel area NML and a second pixel area UDIR. The pixel data of an input image may be written on the display pixels P in the first pixel area NML and the second pixel area UDIR so that the input image is displayed on the display area of the display panel 100.

An optical sensor 30 may be disposed under the display panel 100. The optical sensor 30 may overlap the second pixel area UDIR. The optical sensor 30 may include a light emitting part and a light receiving part. The optical sensor 30 may include one or more optical sensors, such as an image sensor (or camera), an infrared light source, an infrared sensor element, an illuminance sensor element, and the like. The optical sensor 30 may photoelectrically convert light reflected from an external real-world image to capture an external real-world image in a shooting mode or drive an infrared light source to photoelectrically convert infrared light reflected from a user's face in a facial recognition mode to acquire features of the user's face. Further, the image sensor of the optical sensor 30 is driven in a touch sensing mode under the control of the host system 200 to output touch data. Therefore, the display device and mobile terminal of the present disclosure may not only capture an external live image and recognize a face, but also implement a full-screen display screen.

In order to secure sufficient light transmittance of the optical sensor 30, the display pixel density or pixels per inch (PPI) of the second pixel area UDIR overlapping the optical sensor 30 may be set lower than that of the first pixel area NML.

In order to increase the amount of light incident on the optical sensor 30 and prevent optical interference, the second pixel area UDIR includes light emitting elements of display pixels without lines and pixel circuits of a touch sensor layer TSL. The lines and pixel circuits of the touch sensor layer TSL may include a highly reflective medium, such as a metal, to interfere with light traveling to the optical sensor 30 or reduce the amount of light.

The cross-sectional structure of the display panel 100 may include a circuit layer CIR, a light emitting element layer EL, an encapsulation layer ENC, a touch sensor layer TSL, and a cover glass CG stacked on a substrate SUBS, as illustrated in FIG. 3A.

The circuit layer CIR may include a thin film transistor (TFT) array including pixel circuits connected to lines such as the data lines, the gate lines, and the power lines, a demultiplexer array 112, a gate driver 120, and the like. The circuit layer CIR includes a plurality of metal layers insulated from each other with insulating layers interposed therebetween and a semiconductor material layer. The pixel circuit and the gate driver 120 may include a plurality of transistors. The transistors may be oxide thin film transistors (TFTs) including an oxide semiconductor or low temperature poly silicon (LTPS) TFTs including LTPS. Each of the transistors may be implemented as a p-channel TFT or n-channel TFT. The transistors may be turned on in response to the gate-on voltage and turned off in response to the gate-off voltage.

The light emitting element layer EL includes a plurality of light emitting elements driven by a pixel circuit. The light emitting elements may include a light emitting element of a red subpixel, a light emitting element of a green subpixel, and a light emitting element of a blue subpixel. In FIG. 3A, 'R' is a light emitting element of the red subpixel, and 'G' is a light emitting element of the green subpixel. 'B' is a light emitting element of the blue subpixel.

In the display panel 100, an infrared (IR) light source S may be embedded in at least a part of the light emitting element layer EL in the first pixel area NML and the second pixel area UDIR. Referring to FIGS. 3A and 3B, in order not to affect the operation of the light emitting element, the IR light source S may not emit light while the plurality of light emitting elements emit light, but may emit light while the plurality of light emitting elements do not emit light.

By arranging different times for the IR light source S and the plurality of light emitting elements to emit light, even when the IR light source S is disposed on the same light emitting element layer EL as the light emitting element, the operation of the light emitting element may not be affected.

The light emitting element layer EL may further include a light emitting element of a white subpixel. The light emitting element layer EL may have a structure in which the light emitting element and a color filter are stacked. The light emitting elements disposed on the light emitting element layer EL may be covered by multiple protective layers including an organic film and an inorganic film.

The encapsulation layer ENC covers the light emitting element layer EL to seal the circuit layer CIR and the light emitting element layer EL. The encapsulation layer ENC may have a multi-insulating film structure in which organic films and inorganic films are alternately stacked. The inorganic film blocks the penetration of moisture or oxygen. The organic film planarizes a surface of the inorganic film. When the organic film and the inorganic film are stacked in multiple layers, since a movement path of the moisture or oxygen is longer compared to a single layer, the penetration of the moisture and oxygen, which affect the light emitting element layer EL, may be effectively blocked.

The touch sensor layer TSL is disposed on the encapsulation layer ENC. A polarizing plate POL or a color filter layer may be disposed on the touch sensor layer TSL.

The touch sensor layer TSL may include capacitive touch sensors that detect a touch input based on a change in capacitance before and after a touch is input. The capacitive touch sensors are formed between lines. The touch sensor layer TSL may include metal line patterns and insulating films forming capacitors of the touch sensors. The insulating films may insulate a portion intersecting the metal line patterns and planarize the surface of the touch sensor layer TSL.

The polarizing plate POL may improve visibility and a contrast ratio by converting the polarization of external light reflected by the metal of the touch sensor layer TSL and the circuit layer. The polarizing plate POL may be implemented as a polarizing plate or a circularly polarizing plate in which a linear polarizing plate and a phase delay film are bonded. The cover glass CG may be bonded on the polarizing plate.

A color filter layer disposed on the touch sensor layer TSL may include red, green, and blue color filters. The color filter layer may further include a black matrix pattern. The color filter layer may absorb some waves of light reflected from the circuit layer CIR and the touch sensor layer TSL, thereby replacing the role of the polarizing plate POL and increasing the color purity of the image reproduced in the pixel array. When the color filter layer is disposed on the touch sensor layer TSL, the polarizing plate POL may be omitted.

The power supply unit 150 generates a DC voltage (or a constant voltage) required to drive the pixel array of the display panel 100 and the display panel driving circuit using a DC-DC converter. The DC-DC converter may include a charge pump, a regulator, a buck converter, a boost converter, and the like. The power supply unit 150 may output a gamma reference voltage, a constant voltage commonly applied to the display pixels P, a gate-on voltage, a gate-off voltage, etc. by adjusting the level of the DC input voltage applied from a host system 200. The gamma reference voltage is supplied to a data driver 110. The dynamic range of the data voltage output from the data driver 110 is determined according to the voltage range of the gamma reference voltage. The gate-on voltage and gate-off voltage are supplied to a level shifter 140 and the gate driver 120.

The display panel driving circuit writes pixel data of the input image on the display pixels P of the display panel 100 under the control of a timing controller 130, and detects a touch input on the display area. The display panel driving circuit includes a data driver 110, a gate driver 120, a touch sensor driver 160, and the like. The display panel driving circuit may further include a demultiplexer array 112 disposed between the data driver 110 and the data lines DL.

The data driver 110 receives the pixel data of the input image received as a digital signal from the timing controller 130 and outputs a data voltage. The data driver 110 converts the pixel data of the input image into a gamma compensation voltage using a digital-to-analog converter (DAC) to output a data voltage. A gamma reference voltage VGMA may be divided into gamma compensation voltages for each grayscale through a voltage divider circuit. The gamma compensation voltage for each grayscale may be provided to the DAC of the data driver 110. The data voltage is output from each of the channels of the data driver 110 through an output buffer.

The demultiplexer array 112 utilizes a plurality of demultiplexers (DEMUX) to sequentially supply the data voltages output from the channels of the data driver 110 to the data lines DL. The demultiplexer may include a plurality of switch elements disposed on the display panel 100. When the demultiplexer is disposed between the output terminals of the data driver 110 and the data lines DL, the number of channels of the data driver 110 may be reduced. The demultiplexer array 112 may be omitted.

The gate driver 120 may be formed on the circuit layer CIR on the display panel 100 together with the TFT array and lines of the pixel array. The gate driver 120 may be disposed in a bezel area which is a non-display area of the display panel 100 or may be disposed to be distributed in the pixel array where the input image is reproduced.

The gate driver 120 may be disposed in the bezel areas on both sides of the display panel 100 with the display area of the display panel 100 interposed therebetween to supply gate pulses from both sides of the gate lines GL in a double feeding manner. In another embodiment, the gate driver 120 may be disposed on any one side of the left and right bezels of the display panel 100 to supply a gate signal to the gate lines GL in a single feeding manner. The gate driver 120 sequentially outputs the pulses of gate signals to the gate lines under the control of the timing controller 130. The gate driver 120 may sequentially supply the signals to the gate lines GL by shifting the pulse of the gate signal using a shift register.

The data driver 110 and the touch sensor driver 160 may be integrated into a single drive integrated circuit (IC). In a mobile terminal or a wearable terminal, the timing controller 130, the power supply unit 150, the level shifter 140, the data driver 110, the touch sensor driver 160, and the like may be integrated into a single drive IC (D-IC) as illustrated in FIG. 2.

The touch sensor layer TSL includes driving lines and sensing lines, which intersect each other, and driving electrodes. Capacitors are formed between the driving lines and the sensing lines. The lines of the touch sensor layer TSL are disposed in the first pixel area NML excluding the second pixel area UDIR.

The touch sensor driver 160 includes an analog circuit unit (e.g., a circuit), a digital circuit unit (e.g., a circuit), and a coordinate calculation unit (e.g., a circuit). The driving signal is applied to the driving lines to charge the capacitors formed between the lines of the touch sensor layer TSL. The analog circuit unit amplifies the voltages of sensing lines using an amplifier and an integrator to detect a change in capacitance before and after a touch is input. The digital circuit unit converts an analog touch sensing value output from the analog circuit unit into digital data using an analog-to-digital converter (ADC), outputs touch raw data, and compares the touch raw data with a predetermined reference value. The coordinate calculation unit calculates a coordinate value of touch raw data that is greater than the reference value to output touch data including the coordinate information of each touch input. The touch data output from the touch sensor driver 160 is transmitted to the host system 200. The higher the frequency at which the touch data is transmitted, that is, the touch report rate, the faster the host system 200 may recognize the touch input. Therefore, the higher the touch report rate, the better the touch input sensitivity.

The timing controller 130 receives digital video data of input images from the host system 200 and a timing signal synchronized with the data. The timing signals may include a vertical synchronization signal Vsync, a horizontal synchronization signal Hsync, a clock CLK, and a data enable signal DE. Since a vertical period (or frame period) and a horizontal period may be known by counting the data enable signal DE, the vertical synchronization signal Vsync and the horizontal synchronization signal Hsync may be omitted. The data enable signal DE has a cycle of one horizontal (1H) period.

The timing controller 130 generates a data timing control signal for controlling the operation timing of the data driver 110 based on the timing signal received from the host system 200, a MUX control signal for controlling the operation timing of the demultiplexer array 112, and a gate timing control signal for controlling the operation timing of the gate driver 120. The timing controller 130 controls the operation timing of the display panel driving circuit to synchronize the data driver 110, the demultiplexer array 112, and the gate driver 120.

The gate timing control signal generated from the timing controller 130 may be input to the shift register of the gate driver 120 through the level shifter 140. The level shifter 140 may receive the gate timing control signal and generate a start pulse and a shift clock to provide the start pulse and the shift clock to the gate driver 120. The level shifter 140 may increase a swing width of the MUX control signal of the digital signal level input from the timing controller 130, to a voltage between the gate-on voltage and the gate-off voltage and provide the MUX control signal to the demultiplexer array 112.

The host system 200 may include main board of any one of a television (TV) system, a navigation system, a personal computer (PC), a vehicle system, a mobile terminal, and a wearable terminal. The host system 200 may scale an image signal from a video source to match the resolution of the display panel 100 and transmit the image signal to the timing controller 130 along with the timing signal.

In the mobile system, the host system 200 may be implemented as an application processor (AP). The host system 200 may transmit the pixel data of the input image to a D-IC through a mobile industry processor interface (MIPI). The host system 200 may be connected to the D-IC through, for example, a flexible printed circuit (FPC), as illustrated in FIG. 2. The drive IC may be bonded to the display panel 100 in a chip on glass (COG) process.

The host system 200 may execute an application program corresponding to a coordinate value at which a touch input is detected in response to the touch data received from the touch sensor driver 160.

The display panel driving circuit further includes an optical sensor driver 170. The optical sensor driver 170 is driven under the control of the host system 200 to drive the optical sensor 30 in the shooting mode, the facial recognition mode, and the touch sensing mode. The optical sensor 30 includes a plurality of IR light sources to output a photoelectric conversion signal in the shooting mode, the facial recognition mode, and the touch sensing mode. Each IR light source includes a photoelectric conversion element such as a photodiode that outputs an electrical signal when light is received. The IR light sources may be IR light emitting elements, a charge-coupled device (CCD) sensor, and a complementary metal-oxide semiconductor (CMOS) sensor.

The host system 200 converts the data received from the optical sensor 30 into graphic image data in the shooting mode. The host system 200 processes user authentication by comparing the feature point data received from the optical sensor 30 in the facial recognition mode with the user's facial data previously stored. In the touch sensing mode, the host system 200 determines the presence or absence of a touch input based on the touch data received from the touch sensor driver 160 and the touch data received from the optical sensor driver 170.

Figure 4:
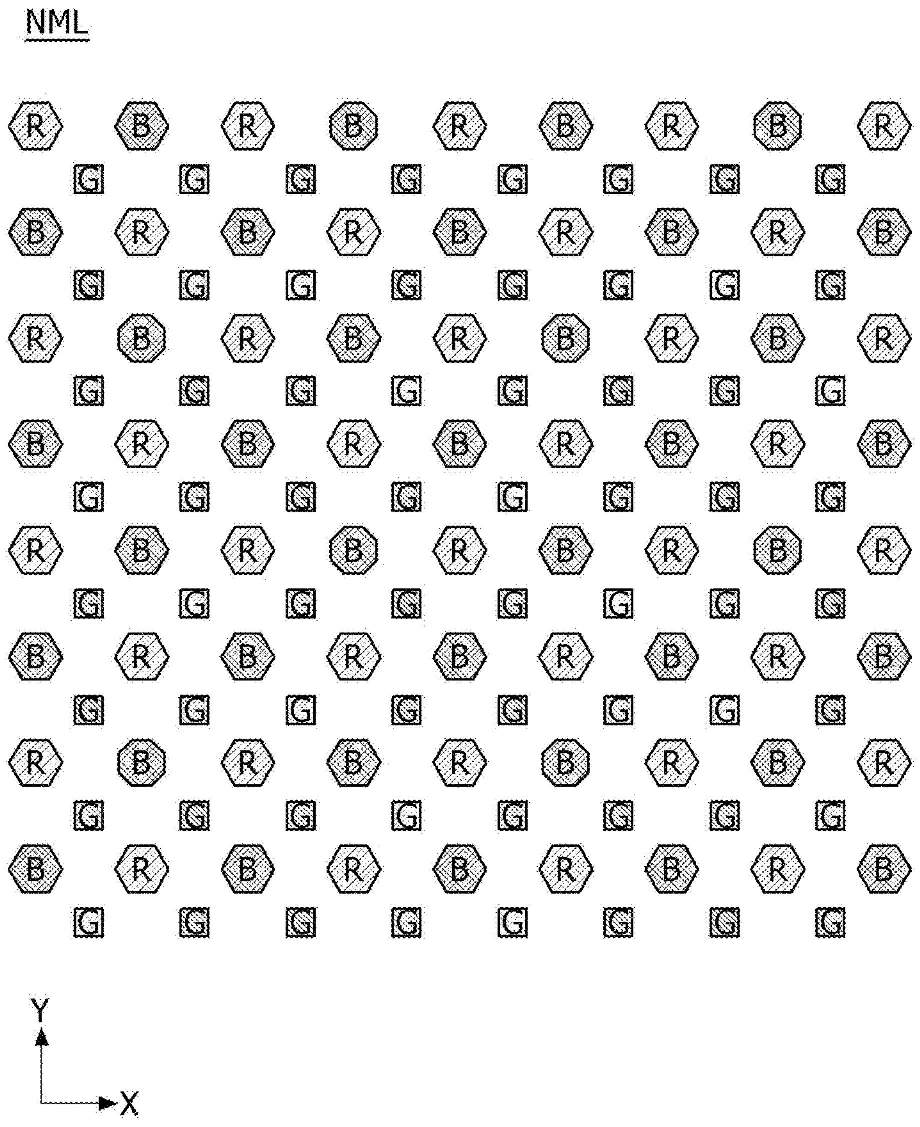
FIG. 4 is a plan view illustrating the arrangement of pixels in a first pixel area according to one embodiment of the present disclosure.
Figure 5A:
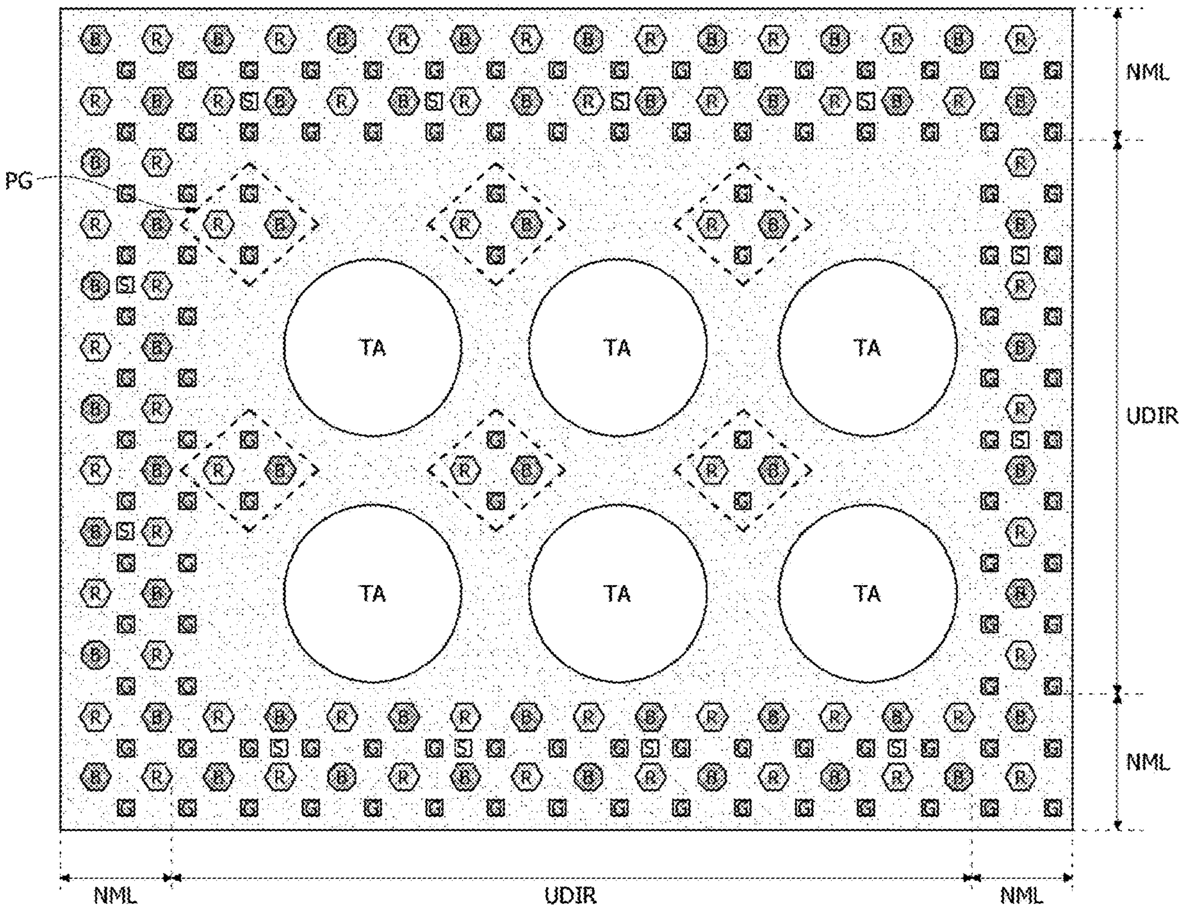
FIG. 5A is a plan view illustrating the arrangement of pixels in a second pixel area according to one embodiment of the present disclosure.
Figure 5B:
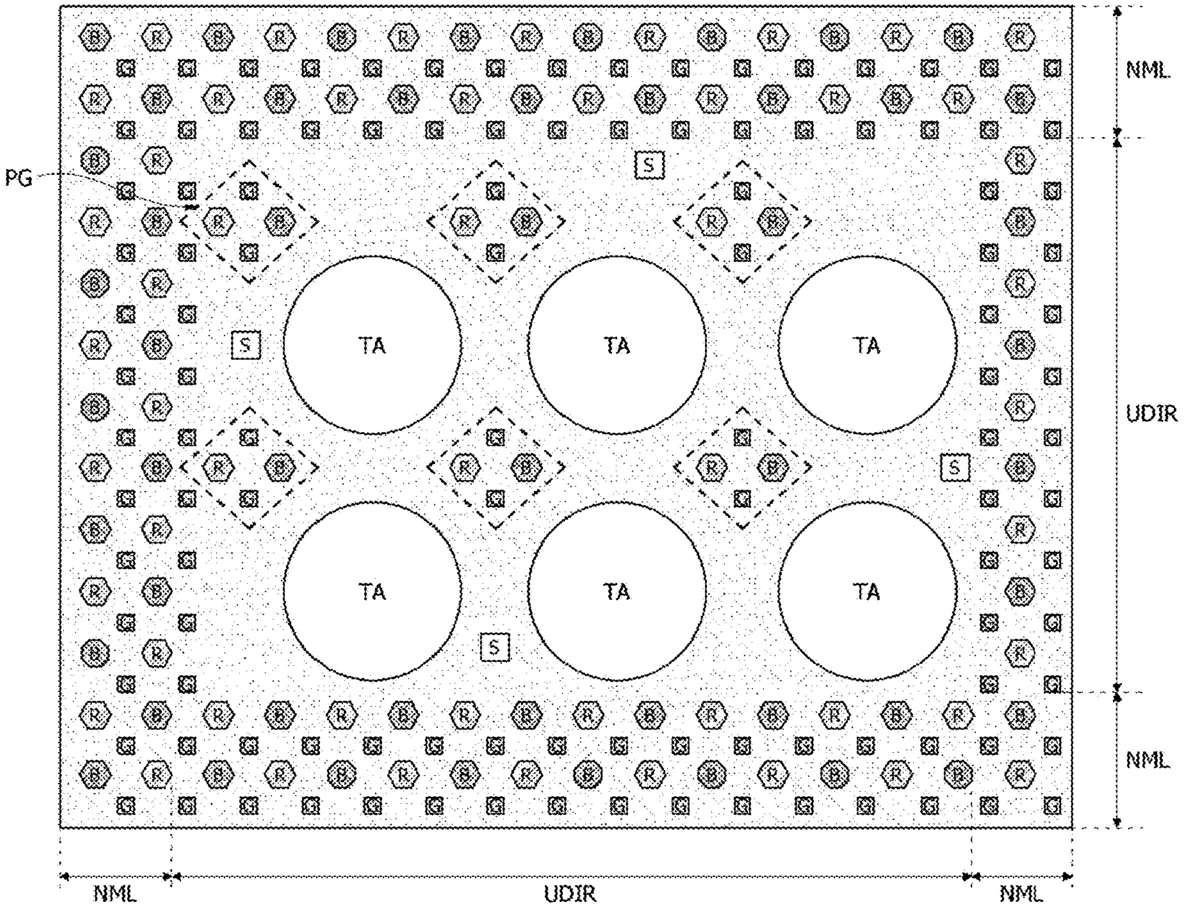
FIG. 5B is a plan view illustrating the arrangement of pixels in the second pixel area according to another embodiment of the present disclosure.

FIG. 4 is a plan view illustrating the arrangement of pixels in a first pixel area according to one embodiment. FIG. 5A is a plan view illustrating the arrangement of pixels in a second pixel area according to one embodiment. FIG. 5B is a plan view illustrating the arrangement of pixels in the second pixel area according to another embodiment of the present disclosure according to one embodiment.

Referring to FIGS. 4 to 5B, subpixels R, G, and B are disposed in each of the first and second pixel areas NML and UDIR. The second pixel area UDIR includes pixel groups PG spaced a predetermined distance from each other and light transmitting parts TA disposed between neighboring pixel groups PG. The pixel group PG of the second pixel area UDIR may include one or two pixels and may include two to four subpixels. A first pixel of the pixel group PG may include a red subpixel R and a first green subpixel G, and a second pixel may include a blue subpixel B and a second green subpixel G, but the present disclosure is not limited thereto. In the second pixel area UDIR, the light transmitting part TA is an area without pixels. The light transmitting parts TA may be made of transparent insulation materials without including metal lines or pixels. For example, a cathode electrode may not be disposed in the light transmitting part TG. Due to the light transmitting parts TA, the PPI of the second pixel area UDIR may be set lower than that of the first pixel area NML. The shape of the light transmitting parts TA is illustrated as a circular shape in FIG. 5A but is not limited thereto. For example, the light transmitting parts TA may be designed to have various shapes such as a circle, an ellipse, a polygon, etc.

The IR light source S may be disposed in the first pixel area NML or the second pixel area UDIR adjacent to the second pixel area UDIR. The IR light source S is not limited thereto and may be used as long as it is configured to increase the amount of light incident on the light receiving part of the optical sensor 30 by being distributed throughout the entire first pixel area NML or the bezel area which is a non-display area.

As illustrated in FIG. 5A, when the IR light source S is disposed in the first pixel area NML, the IR light source S may be disposed between the subpixels R, G, and B. When the IR light source S is disposed in the first pixel area NML, a driving circuit and a driving voltage required for driving the subpixels R, G, and B may be shared.

As illustrated in FIG. 5B, the IR light source S may be disposed in an area in which the light transmitting part TA is not disposed between the pixel groups PG in the second pixel area UDIR.

The IR light source S may increase the amount of light received by the light receiving unit of the optical sensor 30 by additionally emitting light necessary for sensing in addition to the light emitted by the light emitting part of the optical sensor 30 while maintaining the same light receiving area of the optical sensor 30 in an area where the light transmitting part TA is not disposed between the pixel groups PGs.

Figure 6A:
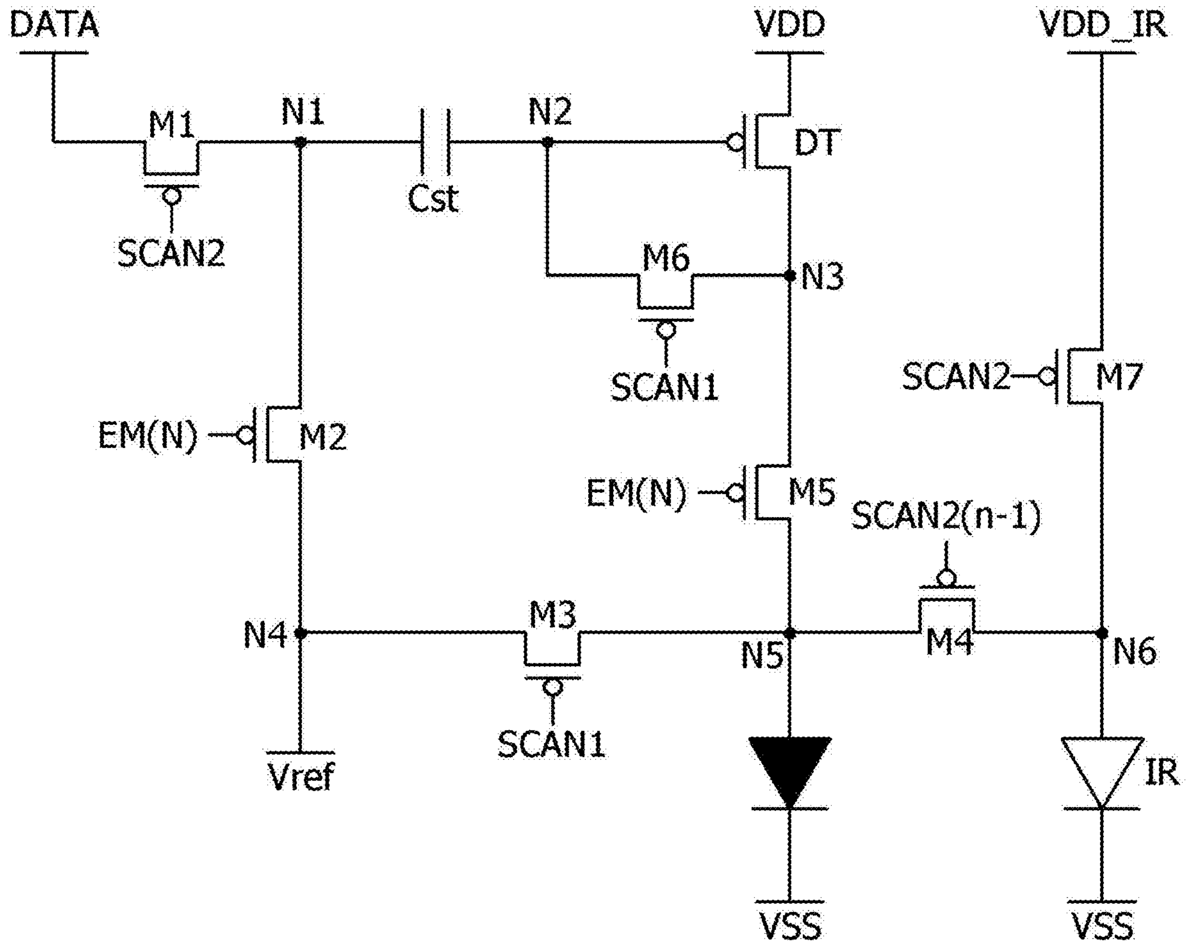
FIG. 6A is a circuit diagram illustrating one example of a pixel circuit according to one embodiment of the present disclosure.
Figure 6B:
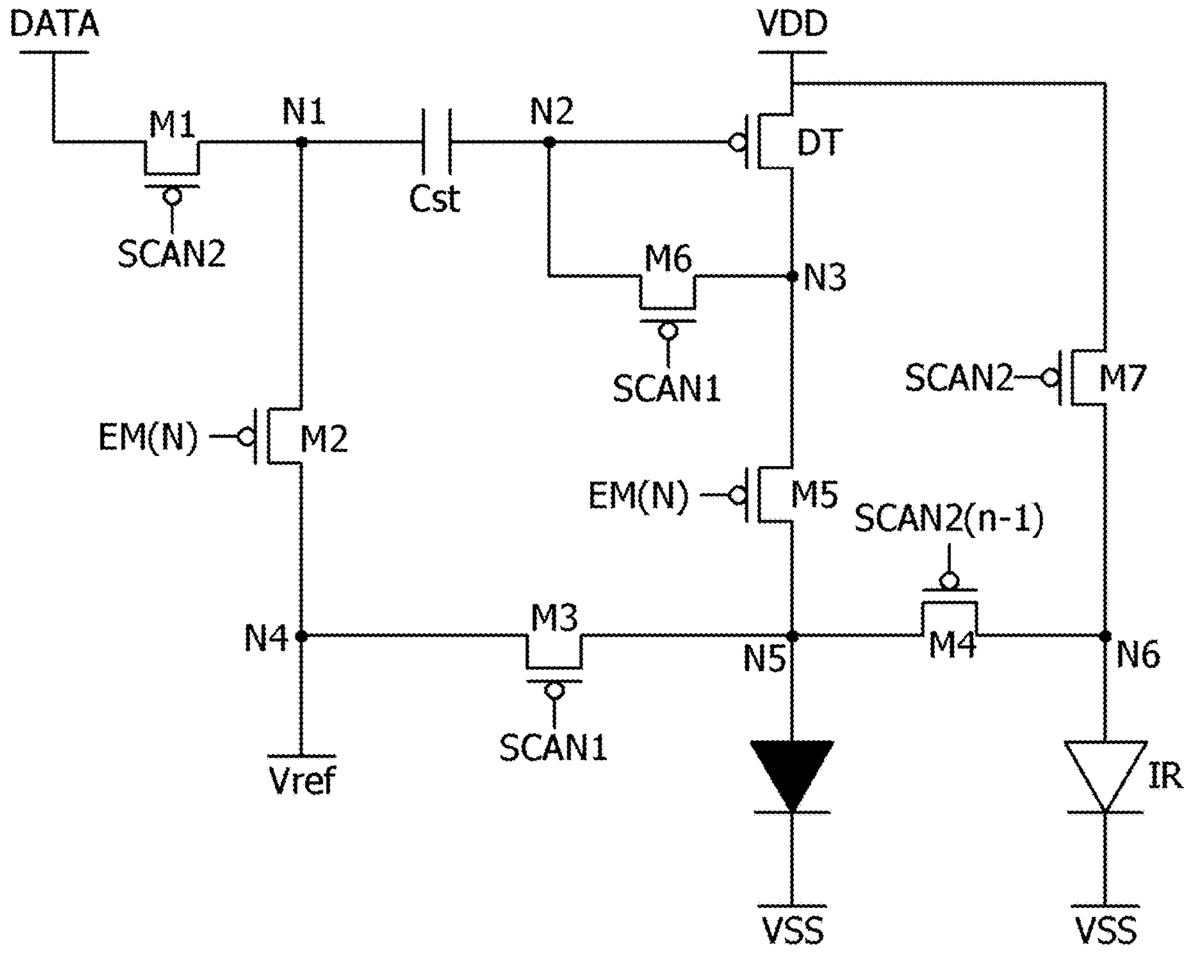
FIG. 6B is a circuit diagram illustrating one example of the pixel circuit according to another embodiment of the present disclosure.

FIG. 6A is a circuit diagram illustrating a pixel circuit according to one embodiment of the present disclosure. FIG. 6B is a circuit diagram illustrating the pixel circuit according to another embodiment of the present disclosure.

Referring to FIGS. 6A and 6B, the pixel circuit includes a light emitting element EL, a driving element DT for driving the light emitting element EL, a plurality of switch elements M1 to M7, a capacitor Cst, and an IR light source S. Each of the driving element DT and the switch elements M1 to M7 may be implemented as an oxide TFT.

The pixel circuit is connected to the data line to which the data voltage (Vdata) of the pixel data is applied and the gate lines to which the gate signals SCAN1 to SCAN2($n$−1) and EM are applied.

A pixel driving voltage VDD and pixel base voltage VSS are set to voltages at which the driving element DT may operate in a saturation area. The reference voltage Vref may be set to a voltage lower than the pixel driving voltage VDD and higher than the pixel base voltage VSS. The reference voltage Vref may be higher than the lowest grayscale voltage or black grayscale voltage within the dynamic range of the data voltage. An initialization voltage Vinit may be set to a voltage lower than the pixel base voltage VSS. The gate-on voltage VGH may be set to a voltage higher than the pixel driving voltage VDD, and the gate-off voltage VGL may be set to a voltage lower than the pixel base voltage VSS. For example, the constant voltage may be set to VDD=12.0 V, VSS=−2.0 V, Vref=1.0 V, Vinit=−3.0 V, VGH=14.0 V to 16.0 V, and VGL=−10.0 to 8.0 V, but the present disclosure is not limited thereto. An IR light source driving voltage VDD_IR may be set to the same voltage as the pixel driving voltage VDD.

The driving element DT generates a current based on a gate-source voltage Vgs to drive the light emitting element EL. The driving element DT includes a first electrode connected to a first constant voltage node to which the pixel driving voltage VDD is applied, a gate electrode connected to a second node N2, and a second electrode connected to a third node N3.

The light emitting element EL may be implemented as an OLED. The light emitting element EL includes an anode electrode, a cathode electrode, and an organic compound layer interposed between these electrodes. The anode electrode of the light emitting element EL is connected to a fifth node N5, and the cathode electrode is connected to a line to which the pixel base voltage VSS is applied.

The capacitor Cst is connected between the first node N1 and the second node N2.

The first switch element M1 is connected between a line to which a data voltage DATA of the pixel data is applied and the first node N1. The first switch element M1 is turned on in response to the gate-on voltage VGL of a second scan signal SCAN2 and connects a line to which the data voltage DATA is applied to the first node N1. The first switch element M1 includes a gate electrode to which the second scan signal SCAN2 is applied, a first electrode connected to the line to which a data voltage DATA is applied, and a second electrode connected to the first node N1.

The second switch element M2 is connected between the first node N1 and a fourth node N4 to which the reference voltage Vref is applied. The second switch element M2 is turned on in response to an emission signal EM(N) to connect the reference voltage Vref to the first node N1. The second switch element M2 includes a gate electrode to which the emission signal EM(N) is applied, a first electrode connected to the first node N1, and a second electrode connected to the fourth node N4.

The third switch element M3 is connected between the fifth node N5 and the fourth node N4 to which the reference voltage Vref is applied. The third switch element M3 is turned on in response to a first scan signal SCAN1 to connect the reference voltage Vref to the fifth node N5. The third switch element M3 includes a gate electrode to which the first scan signal SCAN1 is applied, a first electrode connected to the fourth node N4, and a second electrode connected to the fifth node N5.

The fourth switch element M4 is connected between the fifth node N5 and a sixth node N6. The fourth switch element M4 is turned on in response to a second (N−1) scan signal SCAN2(N−1) to connect the reference voltage Vref to the fifth node N5. The fourth switch element M4 includes a gate electrode to which the second (N−1) scan signal SCAN2(N−1) is applied, a first electrode connected to the sixth node N6, and a second electrode connected to the fifth node N5.

The fifth switch element M5 is connected between the fifth node N5 and the third node N3 to which the pixel driving voltage VDD is applied. The fifth switch element M5 is turned on in response to an emission signal EM(N) to connect the pixel driving voltage VDD to the fifth node N5. The fifth switch element M5 includes a gate electrode to which the emission signal EM(N) is applied, a first electrode connected to the third node N3, and a second electrode connected to the fifth node N5.

The sixth switch element M6 is connected between the second node N2 and the third node N3. The sixth switch element M6 is turned on in response to the first scan signal SCAN1 to connect the pixel driving voltage VDD to the second node N2. The sixth switch element M6 includes a gate electrode to which the first scan signal SCAN1 is applied, a first electrode connected to the second node N2, and a second electrode connected to the third node N3.

The seventh switch element M7 is connected between a first electrode connected to a line to which the IR light source driving voltage VDD_IR is applied and the sixth node N6. The seventh switch element M7 is turned on in response to the second scan signal SCAN2 to connect the IR light source driving voltage VDD_IR to the sixth node N6. The seventh switch element M7 includes a gate electrode to which the second scan signal SCAN2 is applied, a first electrode connected to the IR light source driving voltage VDD_IR, and a second electrode connected to the sixth node N6. The pixel circuit of the present disclosure is not limited thereto, and as illustrated in FIG. 6B, the first electrode of the seventh switch element M7 is connected to the pixel driving voltage VDD so that the light emitting element and the IR light source IR may receive the same driving voltage.

The IR light source IR may be implemented as an infrared light emitting element. An anode electrode of the IR light source IR is connected to the sixth node N6, and the cathode electrode is connected to a line to which the pixel base voltage VSS is applied.

Figure 7:
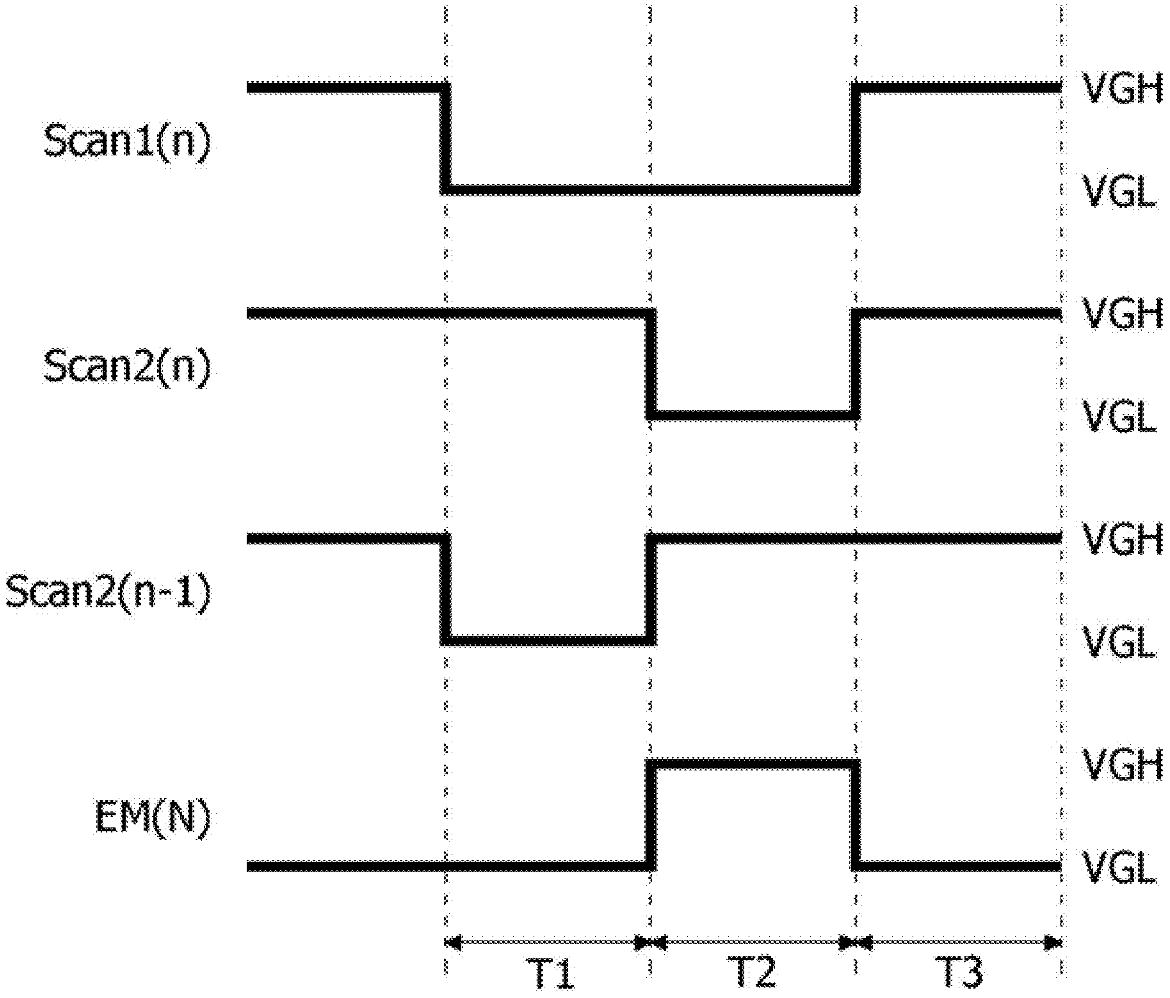
FIG. 7 is a diagram illustrating a method of driving a display device according to the pixel circuits of FIGS. 6A and 6B in accordance with one embodiment of the present disclosure.
Figure 8A:
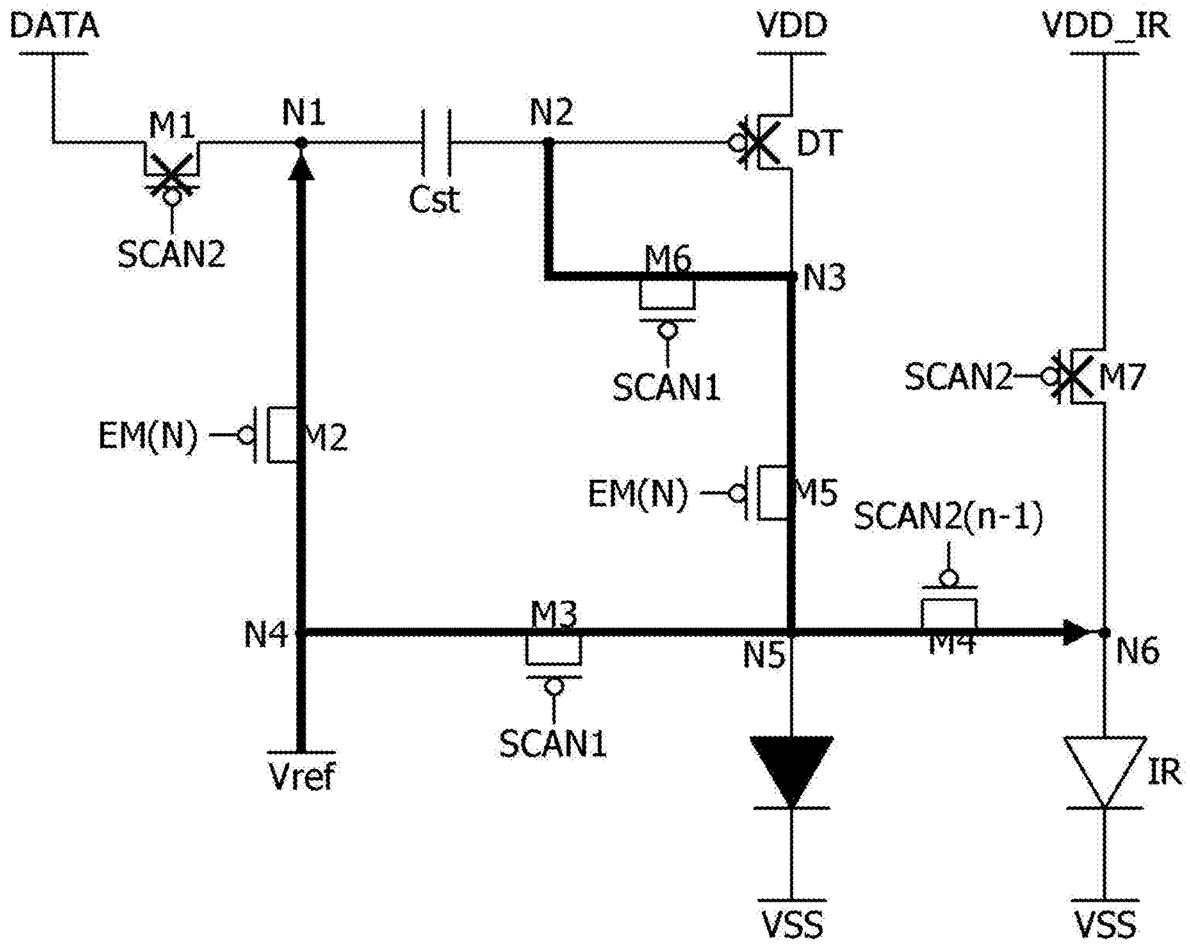
FIGS. 8A to 8C are diagrams illustrating the steps of operations of the pixel circuits of according to one embodiment of the present disclosure.
Figure 8B:
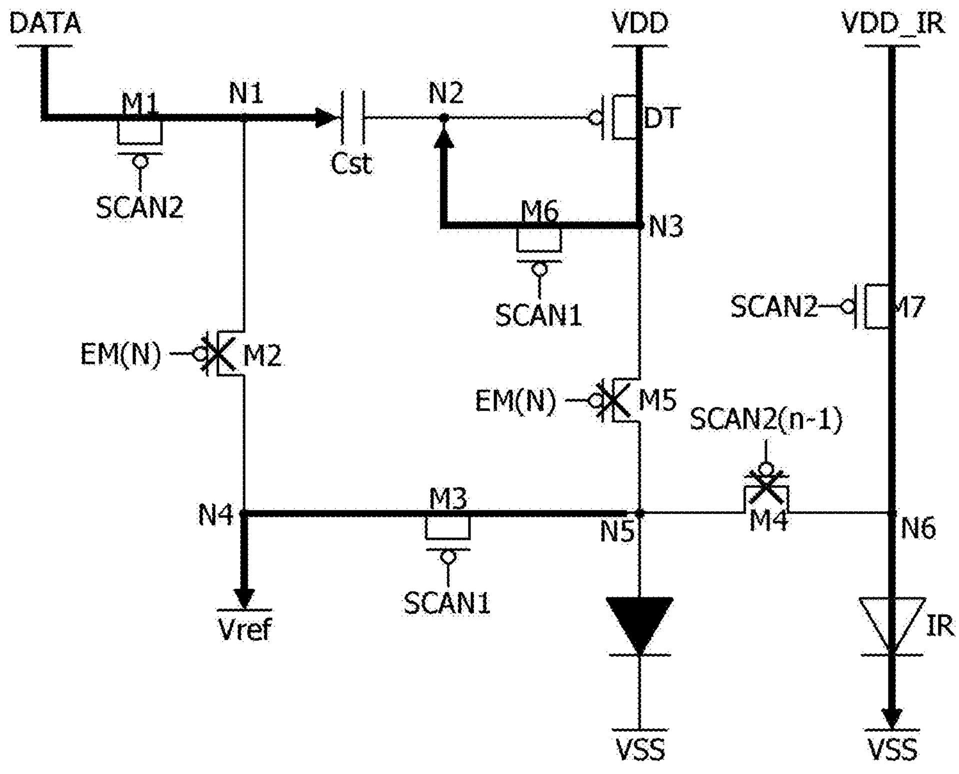
Figure 8C:
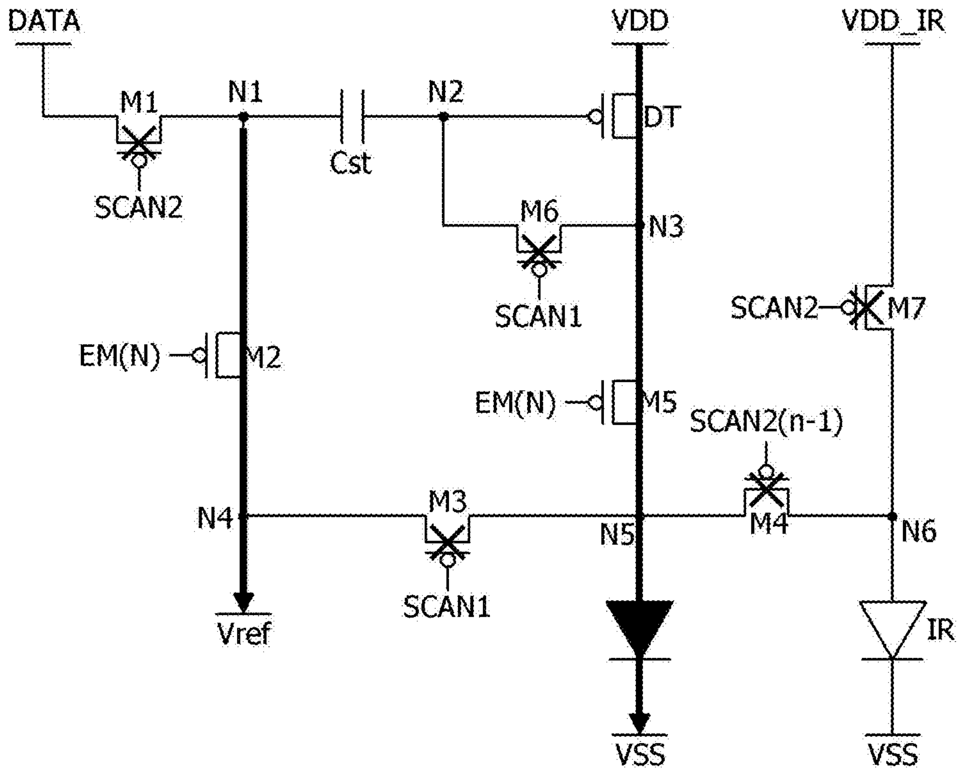

FIG. 7 is a diagram illustrating a method of driving a display device according to the pixel circuits of FIGS. 6A and 6B in accordance with one embodiment of the present disclosure. FIGS. 8A to 8C are diagrams illustrating the steps of operations of the pixel circuits in accordance with one embodiment of the present disclosure.

Referring to FIG. 7, the driving period of the pixel circuit includes an initialization period T1 during which the pixel circuit is initialized, a sensing period T2 during which a threshold voltage Vth of the driving element DT is detected and stored in the capacitor CST, and a light emitting period T3 during which the light emitting element EL emits light.

Referring to FIGS. 7 and 8A, during the initialization period T1, the first scan signal SCAN1, the second (N−1) scan signal SCAN2(N−1), and the emission signal EM(N) are gate-on voltages VGL, and the second scan signal SCAN2 is a gate-off voltage VGH. During the initialization period T1, the second to sixth switch elements M2, M3, M4, M5 and M6 are turned on, and the first and seventh switch elements M1 and M7 and the driving element DT are turned off.

Referring to FIGS. 7 and 8B, during the sensing period T2, the first scan signal SCAN1 and the second scan signal SCAN2 are gate-on voltages VGL, and the second (N−1) scan signal SCAN2(N−1) and the emission signal EM(N) are gate-off voltages VGH. During the sensing period T3, the first, third, sixth, and seventh switch elements M1, M3, M6, and M7 and the driving element DT are turned on, and the second, fourth, and fifth switch elements M2, M4, M5, are turned off. In this case, the IR light source IR may emit light during the sensing period by the current supplied through the seventh switch element M7.

Referring to FIGS. 7 and 8C, during the light emitting period T3, the emission signal EM(N) is a gate-on voltage VGL, and the first scan signal SCAN1, the second scan signal SCAN2, and the second (N−1) scan signal SCAN2 (N−1) are gate-off voltages VGH. During the light emitting period T3, the second switch element M2, the fifth switch element M5 and the driving element DT are turned on, and the first, third, fourth, sixth and seventh switch elements M1, M3, M4, M6 and M7 are turned off. During the light emitting period T3, the driving element DT generates current according to the gate-source voltage Vgs. The light emitting element may emit light during the light emitting period T4 by a current supplied through the driving element DT.

Since the IR light source IR emits light during the sensing period T2 and does not emit light during the light emitting period T3, even when the IR light source IR and the light emitting element share the same driving circuit, it is possible to prevent a phenomenon in which a dark spot or a red spot is displayed during driving.

Figure 9:
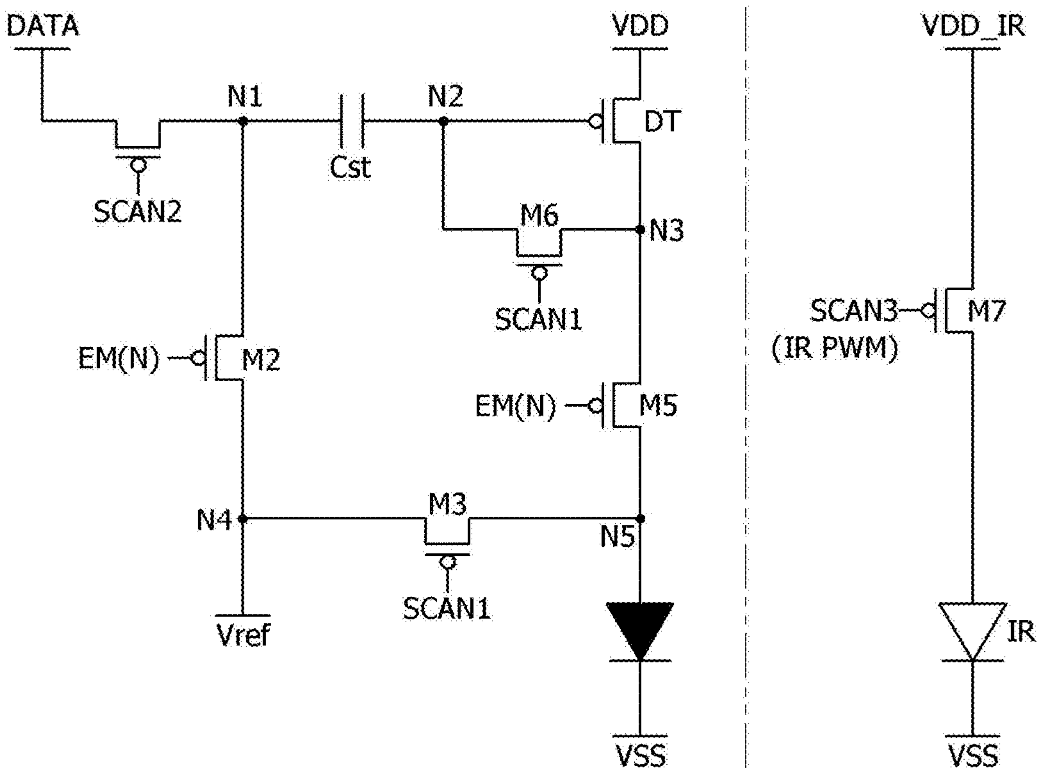
FIG. 9 is a circuit diagram illustrating one example of the pixel circuit according to another embodiment of the present disclosure.

FIG. 9 is a circuit diagram illustrating one example of the pixel circuit according to another embodiment of the present disclosure.

Figure 10:
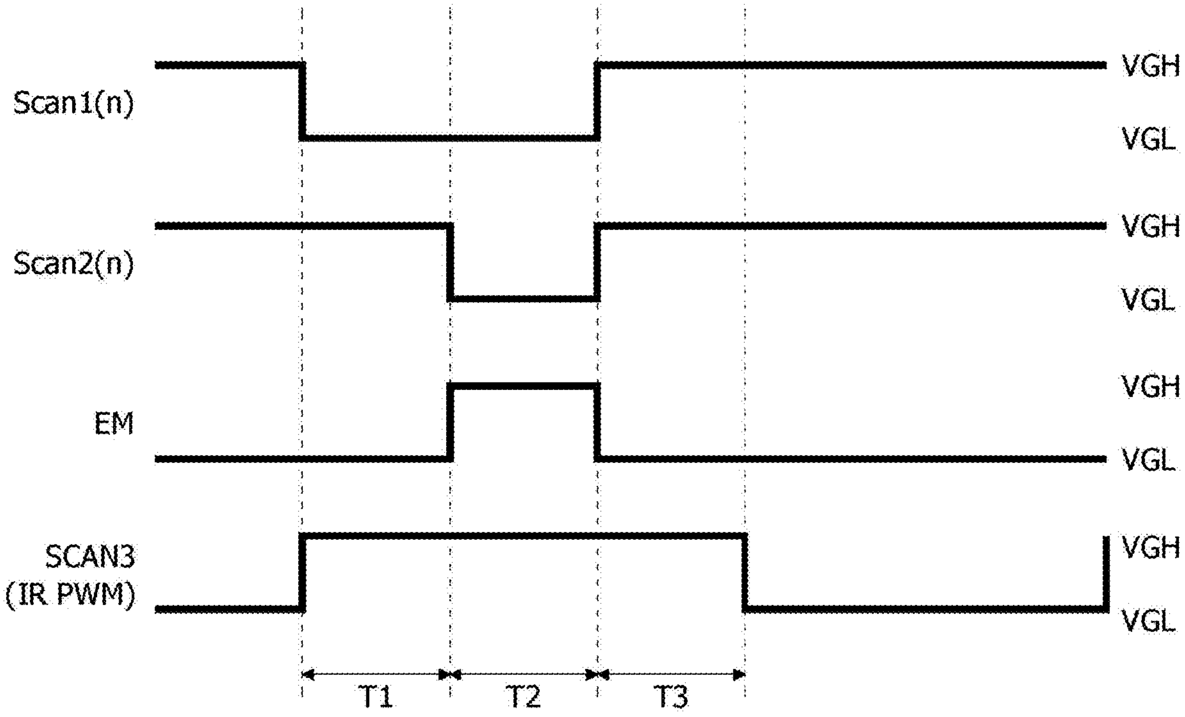
FIG. 10 is a diagram illustrating a method of driving a display device according to the pixel circuit of FIG. 9 in accordance with one embodiment of the present disclosure.

FIG. 10 is a diagram illustrating a method of driving a display device according to the pixel circuit of FIG. 9 according to one embodiment.

Referring to FIGS. 9 and 10, when the IR light source IR is disposed in the second pixel area UDIR in which the light transmitting part TA is not disposed as illustrated in FIG. 5B, a pixel driving circuit required for driving may be disposed separately from the pixel circuit of the light emitting element EL without being connected thereto.

When the IR light source driving circuit is disposed separately from the pixel circuit of the light emitting element EL, the IR light source IR may be turned on/off in a pulse width modulation (PWM) driving manner according to a third scan signal SCAN3 applied to the gate electrode of the seventh switch element M7.

According to the present disclosure, an additional IR light source disposed to be coplanar with a plurality of pixels can be disposed to increase the amount of light received by the IR sensor, thereby improving the lifetime of the display device. Accordingly, long-term power consumption can be reduced and low power driving can be achieved.

The effects according to the present disclosure are not limited to the above-mentioned effects, and other effects which are not mentioned can be clearly understood by those skilled in the art from the disclosure to be described below.

Although embodiments of the present disclosure have been described in more detail with reference to the attached drawings, the present invention is not necessarily limited to these embodiments, and various modifications may be implemented without departing from the technical spirit of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed according to the appended claims, and all technical ideas within the equivalent range should be construed as being included in the scope of the present disclosure. Accordingly, the above-described embodiments should be understood in all respects as illustrative and not restrictive.

What is claimed is:

1. A display panel comprising:
- a display area including a first pixel area and a second pixel area in which a plurality of pixels are disposed;
- an optical sensor overlapping the second pixel area;
- a plurality of infrared (IR) light sources in the display area; and
- a driving circuit configured to drive the plurality of pixels and the plurality of IR light sources to alternately emit visible light and IR light, respectively,
- wherein the driving circuit is configured not to drive the plurality of pixels to emit light during a sensing period during which the driving circuit is configured to drive the IR light sources to emit the IR light, and
- wherein the driving circuit is configured to drive the plurality of pixels to display an image during a light emitting period during which the driving circuit is configured not to drive the IR light sources to emit the IR light.

2. The display panel of claim 1, wherein the optical sensor includes a light receiving part and a light emitting part and the light receiving part measures light emitted by the light emitting part of the optical sensor and the plurality of IR light sources.

3. The display panel of claim 1, wherein the second pixel area includes:
- a plurality of pixel groups including the plurality of pixels; and
- a light transmitting part between the plurality of pixel groups.

4. The display panel of claim 3, wherein pixels per inch (PPI) of pixels from the plurality of pixels disposed in the first pixel area and PPI of the plurality of pixel groups disposed in the second pixel area are different.

5. The display panel of claim 4, wherein the PPI of the second pixel area is less than the PPI of the first pixel area.

6. The display panel of claim 3, wherein IR light sources from the plurality of IR light sources in the second pixel area are disposed in areas in which the plurality of pixel groups and the light transmitting part are not disposed.

7. The display panel of claim 3, wherein each of the plurality of IR light sources is between the plurality of pixel groups in the first pixel area.

8. The display panel of claim 1, wherein the driving circuit includes:
- a driving element including a first electrode to which a pixel driving voltage is applied, a gate electrode connected to a second node, and a second electrode connected to a third node;
- a light emitting element including an anode electrode connected to a fifth node and a cathode electrode connected to a first line to which a pixel base voltage is applied;
- a capacitor connected to the second node and a first node;
- a fourth switch element connected to the fifth node and a sixth node that is connected to an anode electrode of an IR light source from the plurality of IR light sources, the fourth switch element turned on/off in response to a second (n−1) scan signal (n is a positive integer of 2 or more); and
- an IR light source from the plurality of IR light sources that is connected to the first line and a second line to which an IR light source base voltage is applied.

9. The display panel of claim 8, wherein the driving circuit further includes:
- a first switch element connected to the first node and a third line to which a data voltage is applied, the first switch element supplying the data voltage to the first node in response to a second scan signal;
- a second switch element connected to the first node and a fourth node to which a reference voltage is applied, the second switch element supplying the reference voltage to the first node in response to a light emission control signal; and
- a third switch element connected to the fourth node and the fifth node, the third switch element supplying the reference voltage to the fifth node in response to a first scan signal.

10. The display panel of claim 9, wherein the driving circuit further includes:
- a fifth switch element connected to the fifth node and the third node, the first switch element connecting the third node to the anode electrode of the light emitting element in response to the light emission control signal a sixth switch element connected to the second node and the third node and turned on/off in response to the first scan signal, the sixth switch element connecting the second node and the third node when the sixth switch element is turned on; and a seventh switch element connected to the sixth node and a fourth line to which an IR light source driving voltage is applied, the seventh switch element applying the IR light source driving voltage to the sixth node in response to the second scan signal.

11. The display panel of claim 10, wherein the pixel driving voltage of the driving circuit and the IR light source driving voltage are the same.

12. The display panel of claim 10, wherein the pixel driving voltage of the driving circuit and the IR light source driving voltage are different.

13. The display panel of claim 10, wherein gate-on voltages of the first switch element to the seventh switch element are set to a voltage greater than the pixel driving voltage, and gate-off voltages of the first switch element to the seventh switch element are less than the pixel base voltage.

14. The display panel of claim 10, wherein a driving period of the driving circuit includes an initialization period, the sensing period, and the light emitting period, and wherein the first scan signal, the second (N−1) scan signal and the light emission control signal are gate-on voltages, and the second scan signal is a gate-off voltage during the initialization period.

15. The display panel of claim 14, wherein the first scan signal and the second scan signal are gate-on voltages, and the second (N−1) scan signal and the light emission control signal are gate-off voltages during the sensing period.

16. The display panel of claim 15, wherein the light emission control signal is a gate-on voltage, and the first scan signal, the second scan signal and the second (N−1) scan signal are gate-off voltages during the light emitting period.

17. The display panel of claim 9, wherein the reference voltage is less than the pixel driving voltage and greater than the pixel base voltage.

18. The display panel of claim 9, wherein the reference voltage is greater than a lowest grayscale voltage or black grayscale voltage within a dynamic range of the data voltage.

19. The display panel of claim 1, wherein the optical sensor photoelectrically converts light reflected from an external real-world image to capture the external real-world image in a shooting mode or drives an IR light source from the plurality of IR light sources to photoelectrically convert infrared light reflected from a user's face in a facial recognition mode to acquire features of the user's face.

20. The display panel of claim 1, wherein the plurality of IR light sources and a plurality of light emitting elements of the plurality of pixels are disposed on a same layer.

* * * * *